(12) United States Patent
Smith et al.

(10) Patent No.: US 11,593,562 B2
(45) Date of Patent: Feb. 28, 2023

(54) ADVANCED MACHINE LEARNING INTERFACES

(71) Applicant: Affirm, Inc., San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 627 days.

(21) Appl. No.: 16/679,985

(22) Filed: Nov. 11, 2019

(65) Prior Publication Data

US 2020/0151259 A1 May 14, 2020

Related U.S. Application Data

(60) Provisional application No. 62/758,495, filed on Nov. 9, 2018.

(51) Int. Cl.
| | |
|---|---|
| *G10L 15/22* | (2006.01) |
| *G06Q 50/00* | (2012.01) |
| *G06F 40/30* | (2020.01) |
| *G06N 3/08* | (2023.01) |
| *G06N 3/04* | (2023.01) |
| *G06F 9/451* | (2018.01) |
| *G06N 3/006* | (2023.01) |
| *G06F 40/205* | (2020.01) |
| *G06F 40/284* | (2020.01) |

(52) U.S. Cl.
CPC .............. *G06F 40/30* (2020.01); *G06F 9/453* (2018.02); *G06F 40/205* (2020.01); *G06F 40/284* (2020.01); *G06N 3/006* (2013.01); *G06N 3/04* (2013.01); *G06N 3/08* (2013.01)

(58) Field of Classification Search
CPC .......... H04L 12/28; G10L 15/22; G06Q 50/06
See application file for complete search history.

(56) References Cited

U.S. PATENT DOCUMENTS

| | | | | |
|---|---|---|---|---|
| 7,620,894 B1 * | 11/2009 | Kahn | .................. | G06F 3/04895 715/708 |
| 9,691,384 B1 * | 6/2017 | Wang | ...................... | G10L 15/22 |
| 2014/0129272 A1 * | 5/2014 | Hanley | .................. | G06Q 50/06 705/7.13 |
| 2014/0341545 A1 * | 11/2014 | Petrucci | ........... | H04N 21/41422 386/262 |
| 2015/0222450 A1 * | 8/2015 | Ko | .......................... | G08C 17/02 340/5.82 |
| 2016/0269578 A1 * | 9/2016 | Nozawa | .................. | G06T 11/60 |
| 2018/0314780 A1 * | 11/2018 | Bertilsson | ................. | G06F 8/00 |

* cited by examiner

*Primary Examiner* — Shreyans A Patel
(74) *Attorney, Agent, or Firm* — Burr & Forman, LLP

(57) ABSTRACT

A smart assistant is disclosed that provides for interfaces to capture requirements for a technical assistance request and then execute actions responsive to the technical assistance request. Example embodiments relate to parsing natural language input defining a technical assistance request to determine a series of instructions responsive to the technical assistance request. The smart assistant may also automatically detect a condition and generate a technical assistance request responsive to the condition. One or more driver applications may control or command one or more computing systems to respond to the technical assistance request.

18 Claims, 13 Drawing Sheets

ADVANCED MACHINE LEARNING INTERFACES

CROSS-REFERENCE TO RELATED APPLICATIONS

This application claims the benefit of U.S. Provisional Patent Application No. 62/758,495, filed Nov. 9, 2018, which is hereby incorporated by reference in its entirety.

FIELD OF INVENTION

The present disclosure relates generally to methods and systems for advanced machine learning interfaces.

BACKGROUND

Many computer-based tasks may be beyond the capabilities of many users. To accomplish these tasks, many people may rely on the assistance of a technical coworker such as a computer programmer. However, many of these tasks that require a technical coworker may be routine, repetitive, or mundane for the technical coworker to perform. This creates a pain point for both the non-technical coworker and the technical coworker. The non-technical coworker is blocked until the technical coworker completes the task, and the technical coworker finds the task undesirable because it is repetitive.

Technical users also encounter repetitive technical tasks in their daily workflow. These repetitive and monotonous tasks may similarly slow down a technical user, preventing them from working on more challenging or important tasks.

SUMMARY

A smart assistant is disclosed that provides for interfaces to capture requirements for a technical assistance request and then execute actions responsive to the technical assistance request. Example embodiments relate to parsing natural language input defining a technical assistance request to determine a series of instructions responsive to the technical assistance request. The smart assistant may also automatically detect a condition and generate a technical assistance request responsive to the condition. One or more driver applications may control or command one or more computing systems to respond to the technical assistance request.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: displaying, by a computer system, a user interface element for receiving a technical assistance request from a user; receiving, by the computer system, the technical assistance request; analyzing, by a translator, the technical assistance request to determine an intent of the user; generating, by the translator, a sequence of instructions responsive to the intent of the user; and performing, by a driver application, the sequence of instructions, where the driver application controls the execution of at least one computer application, where the at least one computer applications are not the translator and not the driver application. Other embodiments of this aspect include corresponding computer systems, apparatus, and computer programs recorded on one or more computer storage devices, each configured to perform the actions of the methods.

Implementations may include one or more of the following features. The computer-implemented method further including: receiving the technical assistance request in the form of natural language text; parsing, by a parser, the technical assistance request into tokens; and determining the intent of the user from the parsed technical assistance request using a machine learning model. The computer-implemented method where the machine learning model is a neural network. The computer-implemented method further including: receiving the technical assistance request in the form of natural language text; parsing, by a parser, the technical assistance request into tokens; analyzing the parsed technical assistance request with a machine learning model and detecting a need for additional information; generating an information request; displaying the information request to the user; receiving additional information from the user; parsing, by the parser, the additional information into tokens; analyzing the parsed additional information with the machine learning model; and determining the intent of the user from the parsed technical assistance request and the parsed additional information using the machine learning model. The computer-implemented method where the user interface element is a graphical user interface (GUI) request builder, where the GUI request builder includes a plurality of visible interface elements for building the technical assistance request. The computer-implemented method where the driver application controls the execution of the at least one computer applications by using application programming interfaces (APIs) of the at least one computer applications. The computer-implemented method where the driver application controls the execution of the at least one computer applications by using a machine learning-based driver, where the machine learning-based driver is a machine learning model trained on prior uses of the at least one computer applications, the prior uses including video frames of prior uses of the at least one computer applications. The computer-implemented method where the driver application controls the execution of the at least one computer applications by mimicking human input. The computer-implemented method where the technical assistance request is a request to configure a computer environment, and the driver application configures the computer environment according to the technical assistance request. The computer-implemented method further including: where the technical assistance request is a request to detect system outages; analyzing, by an anomaly detection system, a server log to generate a set of anomaly features, the server log including textual events output by a server; and analyzing, by a machine learning model, the set of anomaly features to predict system outages, the machine learning model trained on examples of past system outages and corresponding server logs at the time of the past system outages. Implementations of the described techniques may include hardware, a method or process, or computer software on a computer-accessible medium.

One general aspect includes a computer-implemented method including: monitoring, by a computer system, user actions, where the user actions include at least an edit action, navigate action, or select action; analyzing the user actions using a machine learning model; determining, by the machine learning model based on the user actions, that the user is in need of technical assistance; determining a type of technical assistance needed by the user; generating, by a translator, a sequence of instructions responsive to the type of technical assistance needed by the user; and performing, by a driver application, the sequence of instructions, where the driver application controls the execution of at least one computer applications, where the at least one computer applications are not the translator and not the driver application. Other embodiments of this aspect include corresponding computer systems, apparatus, and computer programs recorded on one or more computer storage devices, each configured to perform the actions of the methods.

Implementations may include one or more of the following features. The computer-implemented method further including: displaying a message to the user to ask if he needs technical assistance, prior to performing the sequence of instructions. The computer-implemented method further including: prompting the user for input about the type of technical assistance needed. The computer-implemented method where the driver application controls the execution of the at least one computer applications by using application programming interfaces of the at least one computer applications. The computer-implemented method where the driver application controls the execution of the at least one computer applications by using a machine learning-based driver, where the machine learning-based driver is a machine learning model trained on prior uses of the at least one computer applications, the prior uses including video frames of prior uses of the at least one computer applications. The computer-implemented method where the driver application controls the execution of the at least one computer applications by mimicking human input. The computer-implemented method where the technical assistance request is a request to configure a computer environment, and the driver application configures the computer environment according to the technical assistance request. The computer-implemented method further including: where the technical assistance request is a request to detect system outages; analyzing, by an anomaly detection system, a server log to generate a set of anomaly features, the server log including textual events output by a server; and analyzing, by a machine learning model, the set of anomaly features to predict system outages, the machine learning model trained on examples of past system outages and corresponding server logs at the time of the past system outages. Implementations of the described techniques may include hardware, a method or process, or computer software on a computer-accessible medium.

BRIEF DESCRIPTION OF THE DRAWINGS

The present disclosure will become better understood from the detailed description and the drawings, wherein.

DETAILED DESCRIPTION

Figure 1:
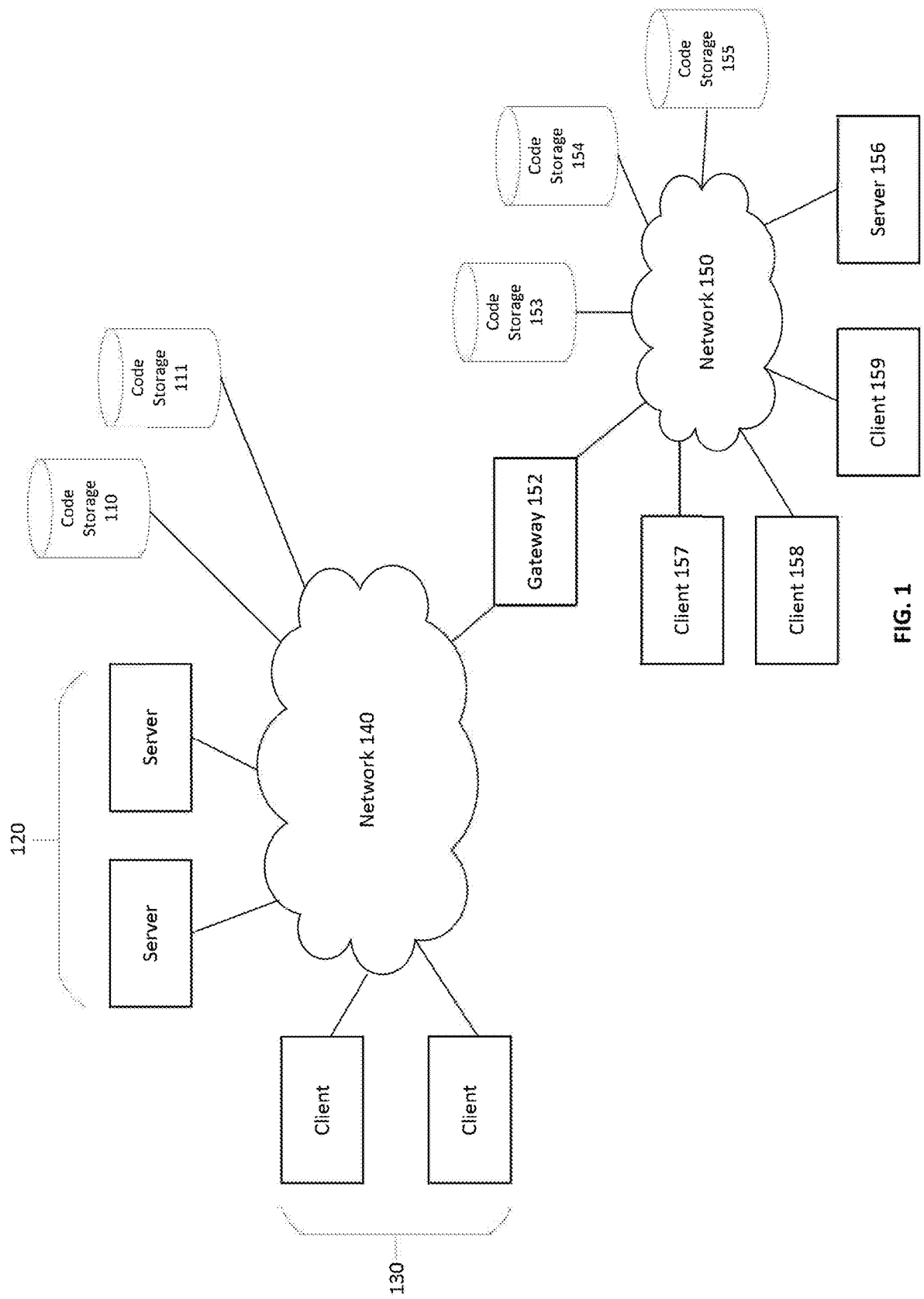
FIG. 1 is a block diagram illustrating an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code storage 110, 111 that store computer code, such as source code. Some external code storage 110, 111 may be globally accessible to any entity on the network 140. Other external code storage 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 155 is an individual code storage that stores code of just one of the programmers on the team. The code storage 155 may be separate from code storage 154 or may be, for example, a subset of code storage 154. Code storage may be any kind of storage. In some embodiments, a code storage comprise a codebase, which is a collection of code for building one or a set of software systems, applications, or software components. Moreover, in some embodiments, a codebase comprises a code repository, where a repository keeps track of changes in the codebase over time and may allow version control and allowing checking in and checking out of code. In some embodiments, code storage comprises a database. A database is any kind of storage and no particular type of database is required. For example, a database may comprise storage of files in memory or permanent storage. Server 156 may exist on the local network 150 and run a program comprised of code from the team of programmers. The code may be team code stored in code storage 154 or an individual branch or subset stored on code storage 155. Server 156 may generate logs or output during the execution of the program, and the logs or output may be retrieved by clients 157, 158, 159 for monitoring or debugging of the program.

Additional servers, clients, computer systems, and local networks may be connected to network 140. It should be understood that where the terms server, client, or computer system are used, this includes the use of networked arrangements of multiple devices operating as a server, client, or computer system. For example, distributed or parallel computing may be used.

Figure 2A:
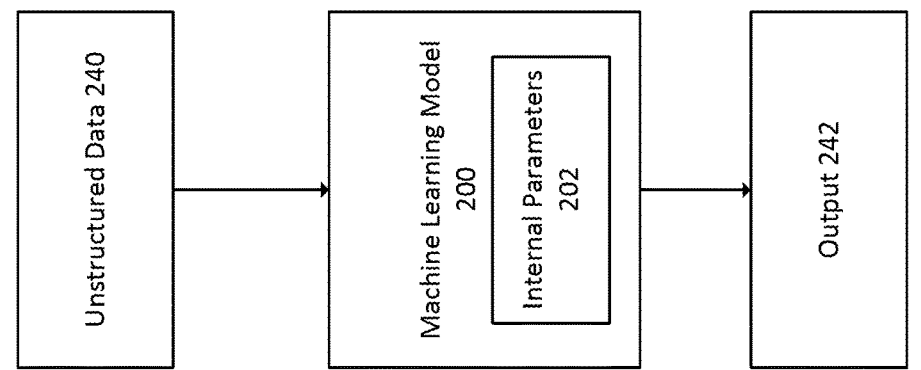
FIG. 2A illustrates an exemplary machine learning model.
Figure 2A:
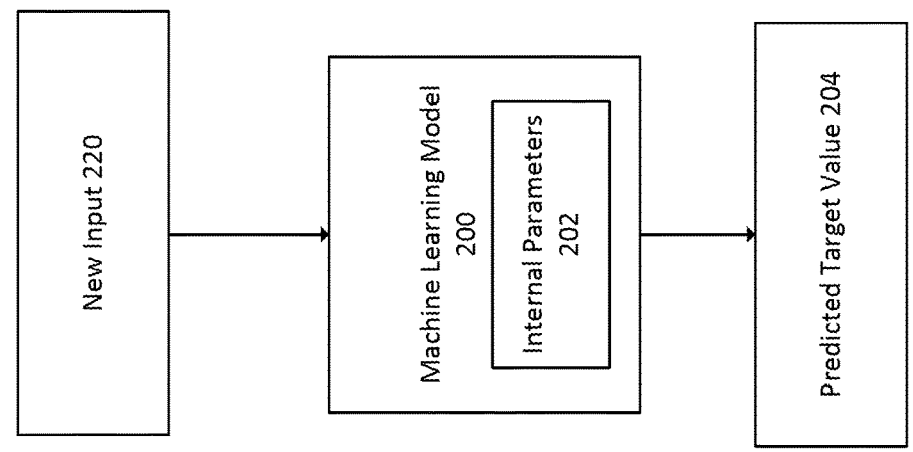
Figure 2A:
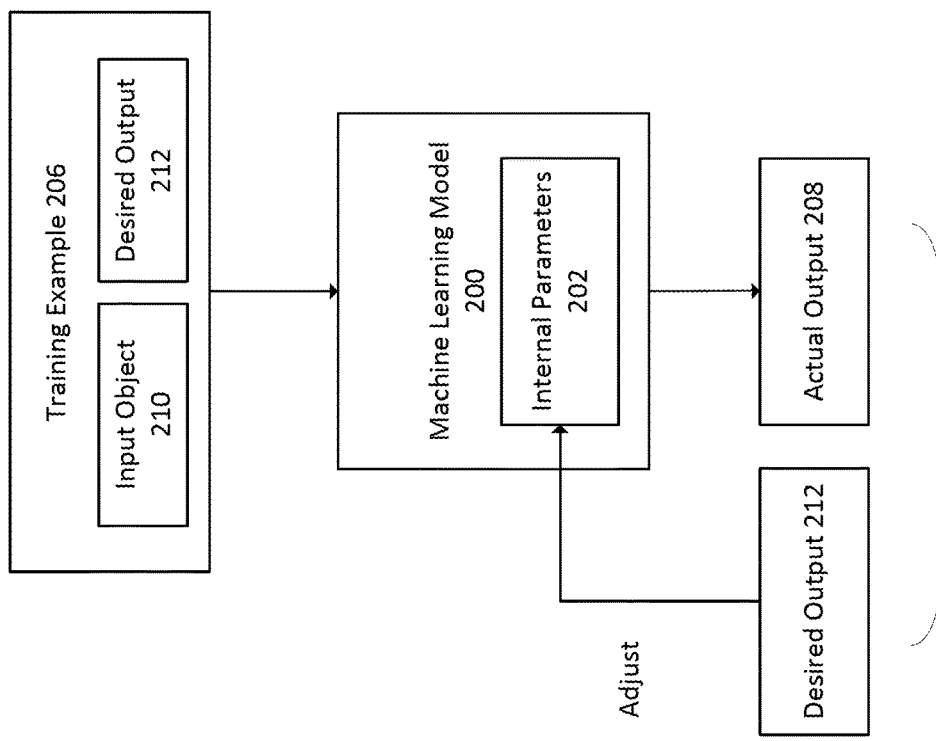

FIG. 2A illustrates an exemplary machine learning model 200. A machine learning model 200 may be a component, module, computer program, system, or algorithm. Some embodiments herein use machine learning for code completion, predictive editing, or predictive navigation. Machine learning model 200 may be used as the model to power those embodiments described herein. In some embodiments, machine learning model 200 uses supervised learning. In such an embodiment, machine learning model 200 is trained with training examples 206, which may comprise an input object 210 and a desired output value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in the unstructured data 240 without training examples 206. Unstructured data 240 is, for example, raw data upon which inference processes are desired to be performed. An unsupervised machine learning model may generate output 242 that comprises data identifying structure or patterns.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

Figure 2B:
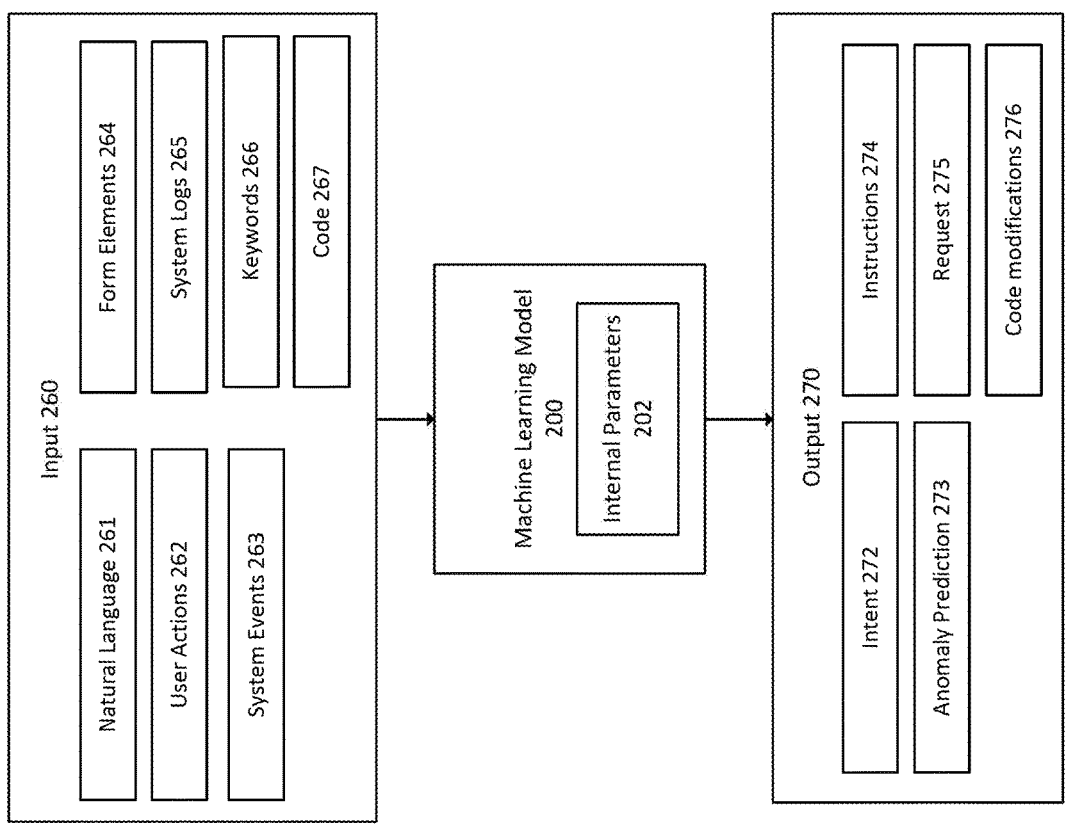
FIG. 2B illustrates use of the machine learning model to perform inference on input comprising data relevant to a programming co-pilot system.

FIG. 2B illustrates use of the machine learning model 200 to perform inference on input 260 comprising data relevant to a programming co-pilot system 340. Input 260 may comprise any of natural language input 261, user actions 262, system events 263, form elements 264, system logs 265, keywords 266, code 267 or other data. The machine learning model 200 performs inference on the data based on its internal parameters 202 that are learned through training. The machine learning model 200 generates an output 270 comprising information or data relevant to helping a programmer, such as technical assistance intent 272, anomaly prediction 273, instructions 274, requests for information 275 and code modifications 276.

Figure 3:
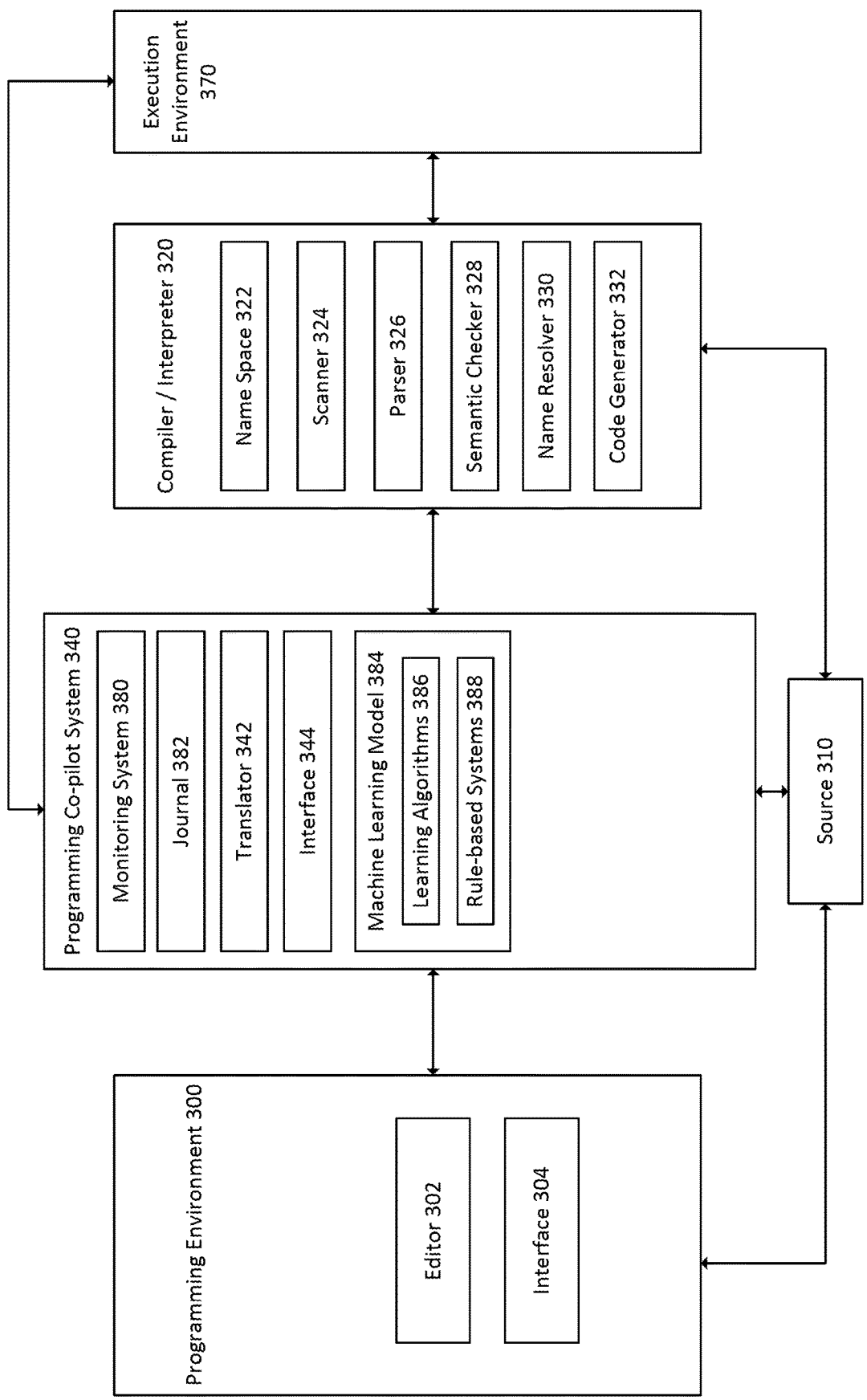
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programmer. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell or operating command line such as the Bash command line is used as a programming environment and may comprise an editor 302. In still other embodiments, single input interactive environments, such as Read-Eval-Print Loop (REPL), may be used as the editor 302. The programming environment may also include other running computer applications on the system such as a web browser.

A compiler or interpreter 320 may compile the code 310 into executable instructions or an intermediate representation or interpret the source code 310 for execution. The compiler/interpreter 320 may comprise a namespace 322 that can be used to store symbols, such as identifiers and types, and to allow for name resolution 330. In some embodiments, the compiler/interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language. In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution. In an execution environment 370, code may be executed, such as for testing or production.

Programming co-pilot system 340 may interact with the programming environment 300, source code 310, compiler/interpreter 320, and execution environment 370 to provide programming assistance to the programmer. Programming co-pilot 340 may include a monitoring system 380 to monitor user actions in a programming environment 300 and editor 302 and system events such as inputs, outputs, and errors. Programming co-pilot 340 may also include a journal 382, which may comprise a digital record of the history of data, such as sequential changes to and versions of source code, user interactions in the editor 302, user interactions in other parts of a system such as a terminal or web browser, system events, and other data. The journal 382 may record data sequentially so that a sequence of events may be exactly reconstructed. Programming co-pilot 340 may include functionalities such as translator 342, technical assistance request interface 344, and other functionalities. Programming co-pilot 340 may include machine learning model 384 to power its functionality, including learning algorithms 386 that learn from data or rule-based systems 388 that use hard-coded rules or heuristics. Although illustrated as one unit, multiple machine learning models 384 may be used in practice to perform or implement different functionality. For example, each function may have a separate machine learning model. Programming co-pilot system 340 may interface with the programming environment 300 through API calls, data streams, inter-process messages, shared data structures, or other methods. In some embodiments, the programming co-pilot 340 is a separate program from the programming environment 300. In other embodiments, the programming co-pilot is a sub-program or component of the programming environment 300.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages, and other code. For example, source code may be Python, Perl, PHP, Javascript, Java, C, C++, HTML, reStructuredText, Markdown, CSS, shell scripts (such as bash, zsh, etc.), and so on.

A. Natural Language Interface

A smart assistant is disclosed that provides for interfaces to capture requirements for a technical assistance request and then execute actions responsive to the technical assistance request. In use, when a user encounters a task that they wish to automate, the user may first choose an interface through which to define the task or capture requirements of the task. In an embodiment, a natural language interface may be used to capture task requirements from a user. In some embodiments, the natural language interface may include a responsive interface to refine the task requirements gathered from the user. For example, in an embodiment, a conversational natural language chat interface may be provided to refine and clarify the requirements of a task. In another embodiment, a graphical interface may be used to define task requirements.

Figure 4:
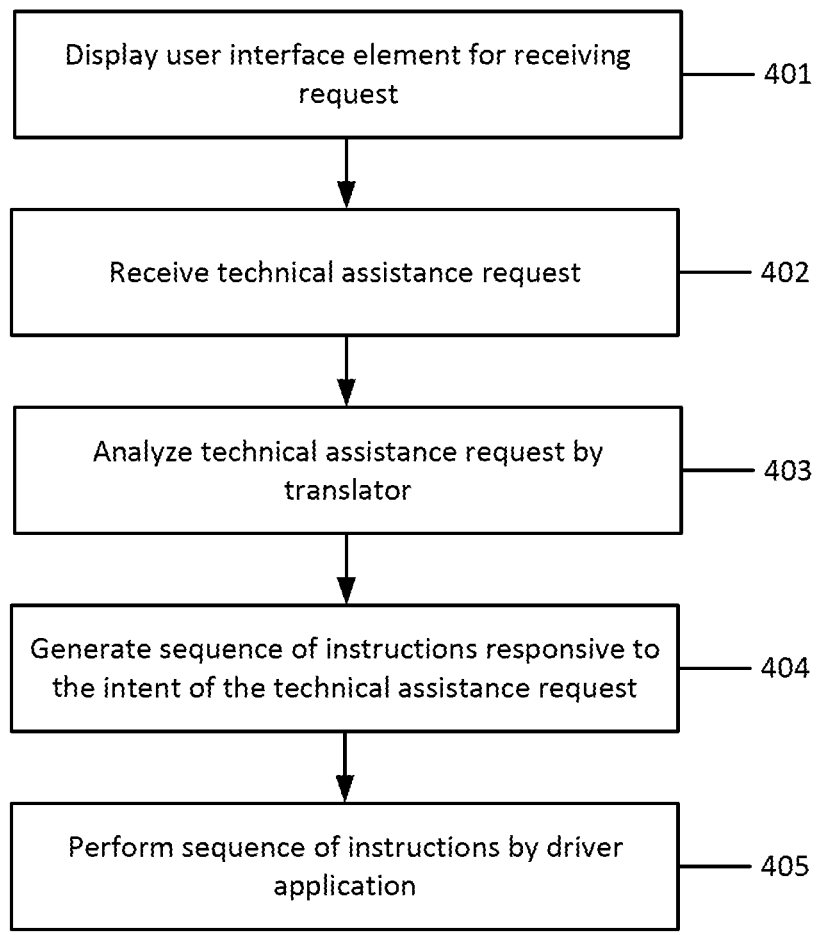
FIG. 4 illustrates the steps of a method for automating a technical assistance request task according to an embodiment.

FIG. 4 illustrates the steps of a method for automating a technical assistance request task according to an embodiment. At step 401, a computer system displays a user interface element for receiving a technical assistance request from a user. In an embodiment, the user interface element may be, for example, a dialog box integrated into a computer program or application that a user requests help with. For example, a web browser may provide a user interface to receive requests for technical assistance with the web browser. In an embodiment, the user interface may be implemented as a browser extension to the web browser. In another embodiment, the user interface may be integrated with an operating system of a computing system and available through the operating system interface regardless of what applications or programs are being run on the computing system. The interface may be able to identify a running program or other context of a technical assistance request to better provide technical assistance.

At step 402, the computer system receives the technical assistance request task. For example, the technical assistance request may be received in the form of a natural language text; query. The technical assistance request may also be received as a set or series of keywords.

At step 403, a translator analyses the technical assistance request to determine an intent of the user. In an embodiment, the translator may include a parser which parses the technical assistance request into a series of tokens. Then, a machine learning network such as a neural network may be used to determine an intent of the technical assistance request.

At step 404, the translator generates a sequence of instructions responsive to the intent of the user. In an embodiment, a trained machine learning network such as a neural network may generate a sequence of instructions for satisfying the technical assistance request.

At step 405, a driver application performs the sequence of instructions. In an embodiment, for example, the driver application may control the execution of one or more computer applications other than the translator and the driver application. For example, the driver application may control the execution of a computer application that originated the technical assistance request. In some embodiments, the driver application controls at least two such computer applications other than the translator and the driver application.

In some embodiments, the driver application may control the execution of a plurality of computer applications residing and running on one or more remote computing platforms. For example, the driver application may control the execution of a plurality of server applications on a plurality of server computing systems in a datacenter context.

In some embodiments, the sequence of instructions may be a single instruction to execute an application. In these embodiments, the driver application may launch the designated application in response to a technical assistance request.

In an embodiment, the driver application controls the execution of computer applications by using application programming interfaces (APIs) of a computer application. In some embodiments, the driver application controls the execution of computer applications by mimicking human input. For example, the driver application may mimic keyboard and/or mouse inputs to a computer application. In these embodiments, the driver application may receive as input a screen output of a computer application to determine what input to send to the application. For example, the driver application may use a computer vision platform to receive a screen display of a computer application, determine what graphical user interface elements are present in the screen display, and to determine what user interface elements to interact with to control the application.

In an embodiment, the driver application controls the execution of a computer applications by using a machine learning-based driver. For example, a machine learning-based driver may be trained on prior uses of the computer application, including the video frames of the graphical user interface as well as a record of the input to the computer application. The driver application may use optical character recognition to identify words associated with received input. For example, if a user clicks on a button that has the text "open," the machine learning-based driver may associate the word "open" with the click on that particular button. In this way, the machine learning-based driver may learn the semantic meaning of recorded user interactions with computer applications.

Figure 5A:
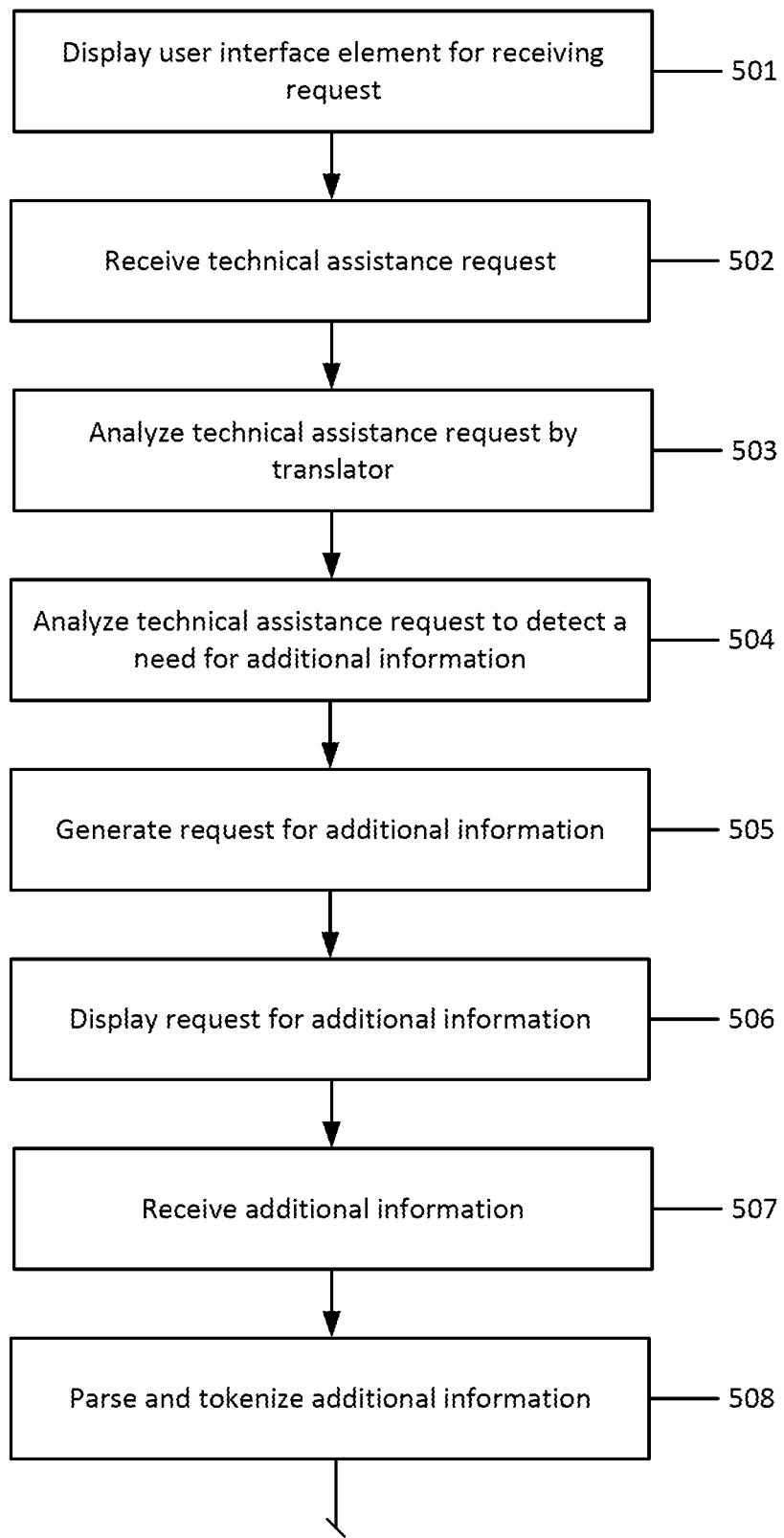
FIGS. 5A-B illustrate the steps of a method for translating natural language text into a technical assistance request according to an embodiment.
Figure 5B:
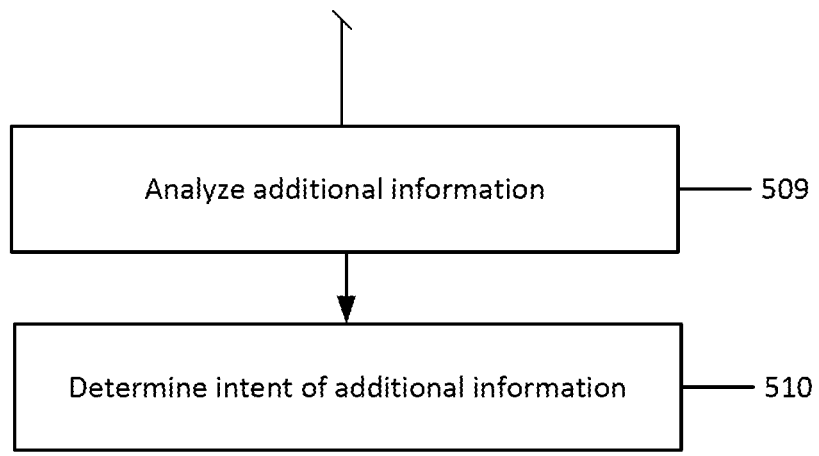

In some embodiments, the smart assistant may identify that it requires further information to respond to a technical assistance request. FIGS. 5A-B illustrate the steps of a method for translating natural language text into a technical assistance request according to an embodiment.

At step 501, a computer system displays a user interface element for receiving a technical assistance request from a user. In an embodiment, the user interface element may be, for example, a dialog box integrated into a computer program or application that a user requests help with. For example, a web browser may provide a user interface to receive requests for technical assistance with the web browser. In an embodiment, the user interface may be implemented as a browser extension to the web browser. In another embodiment, the user interface may be integrated with an operating system of a computing system and available through the operating system interface regardless of what applications or programs are being run on the computing system. The interface may be able to identify a running program or other context of a technical assistance request to better provide technical assistance.

At step 502, the computer system receives the technical assistance request task. For example, the technical assistance request may be received in the form of a natural language text query. The technical assistance request may also be received as a set or series of keywords.

At step 503, a translator parses the technical assistance request into a series of tokens.

At step 504, the parsed and tokenized technical assistance request is analyzed to detect a need for additional information. In an embodiment, a machine learning model may be used to analyze the parsed and tokenized technical assistance request. For example, a machine learning model may identify a technical assistance request template, map the portions of the tokenized technical assistance request to the technical assistance request template, and identify portions of the technical assistance request template that are not mapped to the tokenized technical assistance request. These unmapped portions of the template represent additional information that is required to respond to the technical assistance request.

In an example, if a technical assistance request is initiated by a query "internet not working," the smart assistant may detect that additional information is required to define the technical assistance request fully. The smart assistant may also request additional information if an original query for a technical assistance request includes a typo. In the event of a typo or misspelling, the smart assistant may not be able to fully define a technical assistance request and the feedback from a request for more information may indicate to an end user that a typo was present in the original technical assistance request query.

At step 505, an information request is generated in response to identifying additional information required to respond to the technical assistance request. For example, if a portion of a technical assistance request template is unmapped to a portion of the tokenized technical assistance request input, the template may include clarifying questions associated with that portion which may be used to elucidate the missing information.

In the above example, if a technical assistance request is initiated by a query "internet not working," an additional information request may be "Did you mean: Reset wireless connection?"

At step 506, the information request is displayed, and at step 507, additional information is received. For example, the information request may be displayed to a user in the form of a graphical user interface element indicating the type of information required, and the user may type in additional natural language text responsive to the information request in the graphical user interface element.

At step 508, the received additional information is parsed and tokenized. The parsed and tokenized additional information is then analyzed by the machine learning model at step 509 to map the additional information to the original technical assistance request. For example, the additional information may be mapped to the portions of the technical assistance request template that required additional information as previously identified. Additional information may be received when the user has left out some important parameters to the task. For example, if the user originally requested "Connect to Wi-Fi", the smart assistant could ask "Which wireless network would you like to connect to?" along with a list of all the options for wireless network connections available to the user.

At step 510, the machine learning model determines the intent of the parsed technical assistance request and the parsed additional information. The intent of the parsed technical assistance request and the parsed additional information may then be used to generate a series of instructions responsive to the technical assistance request.

B. Graphical Request Builder Interface

Figure 6:
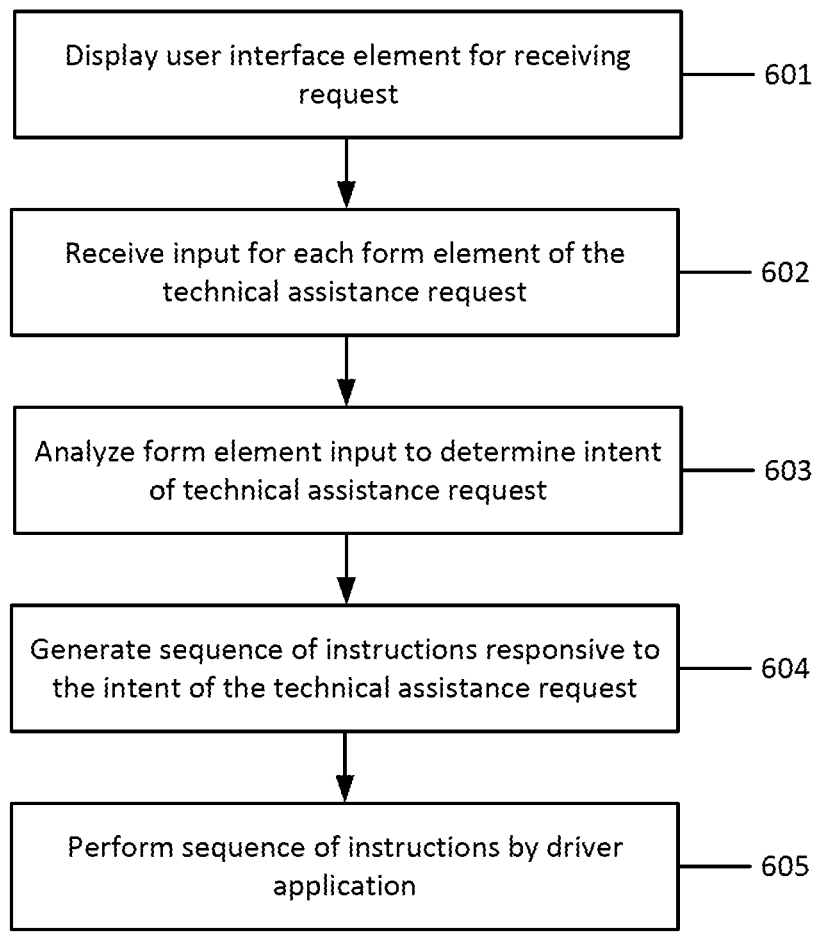
FIG. 6 illustrates the steps of a method for defining a technical assistance request by a request builder to arrange form elements according to an embodiment.

In some embodiments, technical assistance requests may be defined using a graphical user interface request builder to arrange a plurality of visible interface elements for building the technical assistance request. FIG. 6 illustrates the steps of a method for defining a technical assistance request by a request builder to arrange form elements according to an embodiment.

At step 601, a computer system displays a user interface element for receiving a technical assistance request from a user. In an embodiment, the user interface element may be, for example, a dialog box integrated into a computer program or application that a user requests help with. For example, a web browser may provide a user interface to receive requests for technical assistance with the web browser. In an embodiment, the user interface may be implemented as a browser extension to the web browser. In another embodiment, the user interface may be integrated with an operating system of a computing system and available through the operating system interface regardless of what applications or programs are being run on the computing system. The interface may be able to identify a running program or other context of a technical assistance request to better provide technical assistance.

In an embodiment, the user interface may comprise a graphical user interface defining a series of form elements defining the technical assistance request. Form elements may be specific to the context or state of a computing system, such as the open computer applications. Each form element may be comprised of a label and an input field in which to receive information related to the form element. For example, a form element may have a label "I need help with:" and an input field for receiving an indication of what the technical assistance request is related to.

At step 602, the computer system receives input for each form element of the technical assistance request. For example, the input to each form element of the technical assistance request may be received in the form of a natural language text or series of keywords.

At step 603, a translator analyses the form elements of the technical assistance request to determine an intent of the user. In an embodiment, the translator may include a parser which parses the input to each form element of the technical assistance request into a series of tokens. Then, a machine learning network such as a neural network may be used to determine an intent of the form element of the technical assistance request. In some embodiments, additional form elements may be presented to the user to further refine or clarify the technical assistance request. For example, in the example above, a form element may receive the input "internet connection" in connection with the "I need help with" form element. Then, the smart assistant may present a second form element labeled "what would you like to do." The second form element may receive an input of "reset wireless connection" to further define the technical assistance request, for example.

At step 604, the translator generates a sequence of instructions responsive to the intent of the user. In an embodiment, a trained machine learning network such as a neural network may generate a sequence of instructions for satisfying the technical assistance request. In some embodiments, a sequence of instructions may be generated for each form element of a technical assistance request. In some embodiments, a sequence of instructions may be generated for a plurality of form elements of a technical assistance request.

At step 605, a driver application performs the sequence of instructions. In an embodiment, for example, the driver application may control the execution of one or more computer applications other than the translator and the driver application. For example, the driver application may control the execution of a computer application that originated the technical assistance request. In some embodiments, the driver application controls at least two such computer applications other than the translator and the driver application.

Once a technical assistance request has been defined through one of the approaches disclosed above, a driver application implements the technical assistance request by executing the steps of the task in sequence. Below are disclosed several examples of driver applications in various embodiments.

In some embodiments, a technical assistance request may be defined for control of one or more computing systems. For example, in an embodiment, a technical assistance request may define a series of instructions for configuring a single computing system. An example of a single computing system may be, for example, an end user's desktop computing environment. In some embodiments, a technical assistance request may define a series of instructions for two or more computing systems. In some examples, a technical assistance request may configure or control a plurality of desktop computing environments in an enterprise setting, or a technical assistance request may configure or control a plurality of server computing systems in a datacenter to communicate or cooperate with each other in some way. For example, a technical assistance request may configure a high performance computing cluster or a distributed application architecture.

In an example, the smart assistant may be used by a user to set up computing infrastructure even if the user may not know how to do so. In this example, a technical assistance request may comprise a natural language query expressing the user's intent to install and configure web servers, database servers, load balancers, and/or other such infrastructure for some task or environment. The smart assistant may then make the appropriate API calls to provision and configure servers, copy files, code, or data to the servers, and start the appropriate services on the servers to implement the computing infrastructure as detailed in the user's technical assistance request. The smart assistant may further configure the computing environment according to the technical assistance request, for example by configuring automatic scaling or load-balancing behaviors of the computing environment. The smart assistant may be trained on past behavior of users performing similar tasks. In some embodiments, the smart assistant may also be trained on hard-coded behaviors or scripts to implement some behaviors.

C. Automatic Assistance

In some embodiments, the smart assistant may help the user with a technical assistance request without explicit invocation. In these embodiments, the smart assistant may determine that there is a high likelihood that the user will need to complete a certain task based on the previous actions the user has taken. Then, the smart assistant may automatically generate a technical assistance request based on the user's actions and the computing environment. In some embodiments, the generated technical assistance request may be executed automatically, and in some embodiments the smart assistant may require user authorization prior to executing the technical assistance request. For example, if a user's wireless connection cuts out unexpectedly, the smart assistant may show a dialog box to the user asking if they want help fixing it.

Figure 7:
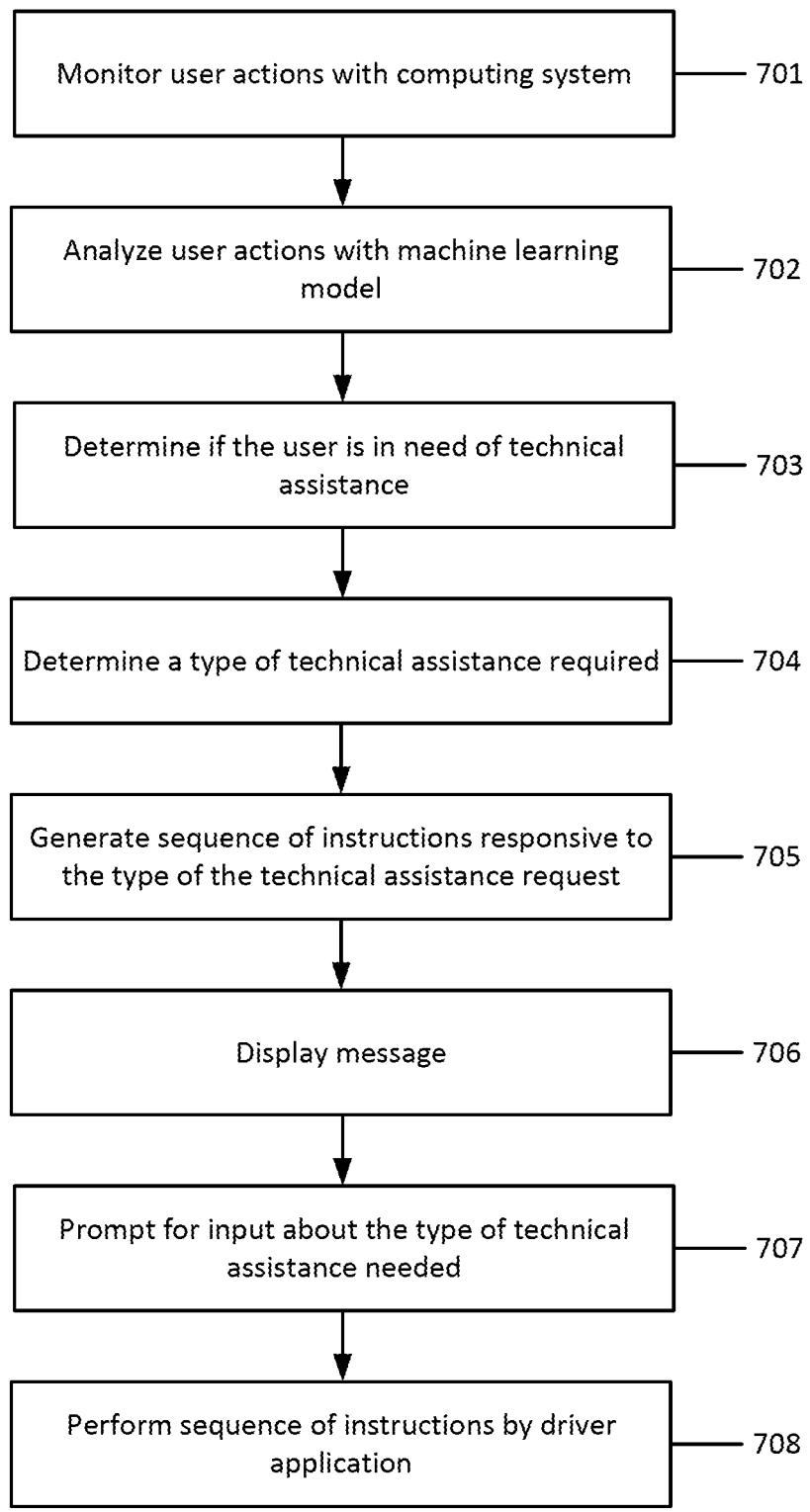
FIG. 7 illustrates the steps of a method for automatically performing a technical assistance request task according to an embodiment.

FIG. 7 illustrates the steps of a method for automatically performing a technical assistance request task according to an embodiment. At step 701, a computer system monitors user actions of a computing system. User actions may include, for example, edit actions, navigate actions, and select actions. In an example, a user action may include a user attempting to access a shared folder on a network. At step 702, the user actions are analyzed using a machine learning model. In some embodiments, the machine learning model may be a trained neural network, for example.

At step 703, the machine learning model determines, based on the user actions, that the user is in need of technical assistance. The machine learning model may be trained on previously recorded or observed user interactions and invocations of technical assistance requests. For example, if the user above is unable to access the shared network folder, the machine learning model may determine that the user is in need of technical assistance.

At step 704, the machine learning model determines a type of technical assistance needed by the user. For example, in the shared network folder example above, the machine learning model may determine that the user needs technical assistance in accessing the shared folder.

At step 705, a translator generates a sequence of instructions responsive to the type of technical assistance needed by the user. In the example above, the sequence of instructions may include automatically enabling network sharing on the computing system, finding the shared folder, requesting access to the shared folder if necessary, inputting a password or other user authentication if necessary, and opening the shared folder.

At step 706, displaying a message to the user to ask if he needs technical assistance, prior to performing the sequence of instructions. The user may indicate that they do require technical assistance, or that they do not require technical assistance. This response may be used for further training of the machine learning network to further learn when user actions are likely indicative of requiring technical assistance.

At step 707, optionally prompting the user for input about the type of technical assistance needed. The smart assistant may present a conversational interface that accepts natural language responses from the user to further specify the technical assistance request. Any additional information received may be used to modify the sequence of instructions or to append additional instructions to the sequence of instructions.

At step 708, performing, by a driver application, the sequence of instructions, wherein the driver application controls the execution of at least one computer applications, wherein the at least one computer applications is not the translator and not the driver application. In some embodiments, the driver application controls the execution of at least two computer applications, wherein the at least two computer application are not the translator and not the driver application.

D. Smart Assistant for Detecting and Addressing System Outages

In some embodiments, the smart assistant may monitor computing systems behaviors to detect potential system outages or faults and assist users in addressing the detected condition.

Figure 8:
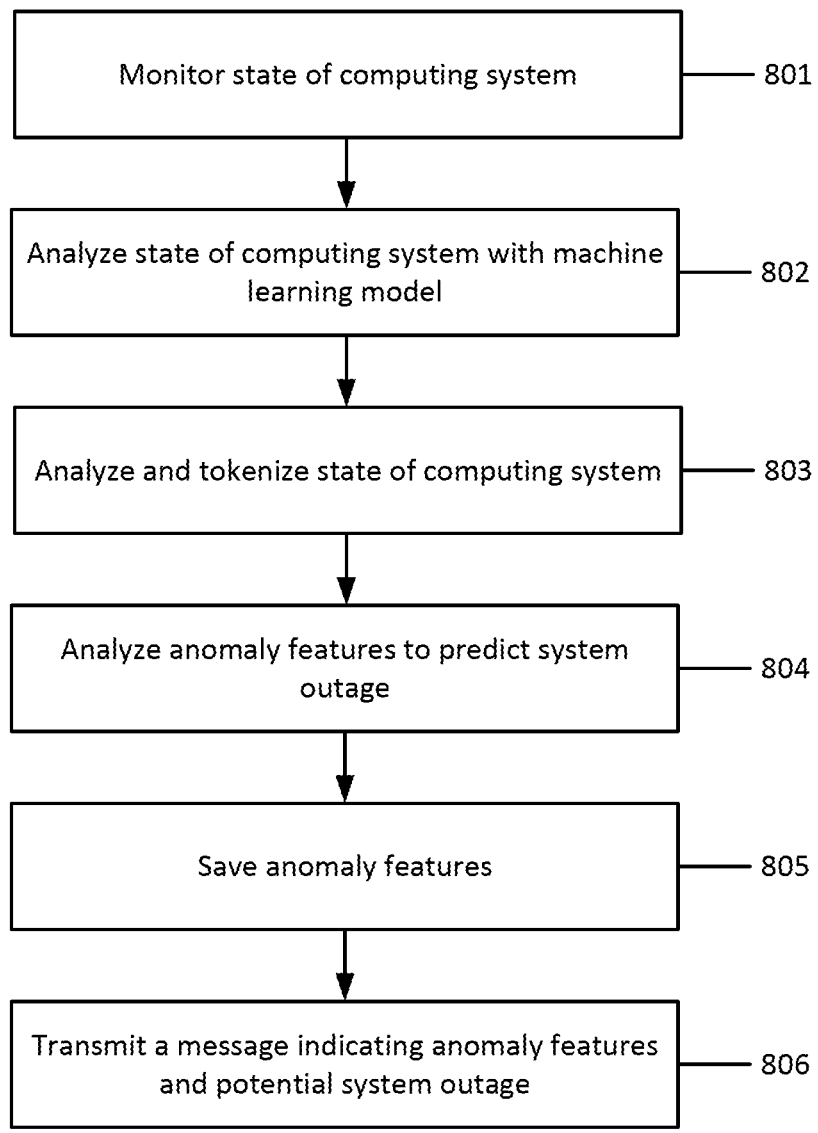
FIG. 8 illustrates the steps of a method for detecting system outages according to an embodiment.

FIG. 8 illustrates the steps of a method for detecting system outages according to an embodiment. At step 801, a computer system monitors the state of one or more computing systems. In an embodiment, one or more log files of the one or more computing systems are monitored. In an embodiment, resource usage of the one or more computing systems are monitored. For example, CPU usage, network interface usage, memory consumption, or disk usage may be monitored. In an embodiment, the computer system may integrate directly with a runtime environment of a system to access a granular view of resource usage from the runtime's perspective. For example, in addition to knowing that memory usage is high, the smart assistant can monitor information about currently executing code such as the execution path of currently executing and combine that information with other state information such as memory usage or other resource usage. In this way, the smart assistant may gather additional information to aid in diagnosing issues.

At step 802, the state of the one or more computing systems are analyzed using a machine learning model. In an embodiment, an anomaly detection system monitors one or more server logs comprising textual events output by a server. The anomaly detection system may also monitor any or all of the sources monitored by the computer system in step 801 or elsewhere herein.

At step 803, the state of the one or more computing systems are tokenized. For example, if the state of the one or more computing systems includes server logs, the server logs may be tokenized into a set of anomaly features. An anomaly feature may be, for example, the presence of an anomalous error code in a log file, or a ratio of erroneous indications in a log file. For example, a proportion of errors codes to success codes in a log file may be an anomaly feature. If resource usages of the computing systems are monitored, an anomaly feature may represent an unusual pattern of resource usage. In some embodiments, a combination of log files and resource usage may be combined in anomaly detection. For example, a spike in resource usage combined with an unusual log behavior may indicate an anomaly feature.

At step 804, a machine learning model analyzes the set of anomaly features to predict system outages. In an embodiment, the machine learning model is trained on examples of past system outages and corresponding anomaly features at the time of the past system outages. Patterns of anomaly features associated with system outages are identified by the machine learning model, and a response taken. In an embodiment, the machine learning model is trained by a supervised learning method using historical server logs.

At step 805, in response to determining that the set of anomaly features predict a system outage, the set of anomaly features may be saved prior to a system outage for future investigation. At step 806, the smart assistant may transmit a message indicating the set of anomaly features and the possibility of a pending system outage to a user. In an embodiment, the smart assistant may provide a user interface for the user to interact with the smart assistant to further investigate a system outage after it has occurred. For example, a responsive conversational interface may be provided to enable users to use natural language queries to traverse and dissect the recorded information to diagnose and respond to a system outage.

In some embodiments, the smart assistant may use statistical models to filter out available information to determine the information most relevant to an engineer user diagnosing a system outage or other failure. The intelligent runtime may decide which information to gather and record when an error occurs, when a log statement is being printed, or when other events happen. The intelligent runtime may use statistical models to decide which information is most likely to be relevant for future analysis. In some embodiments, the intelligent runtime may use a trained machine learning network to decide which information is most likely to be relevant for future analysis. In some embodiments, a machine learning model may be trained on historical data including a type of error or failure and feedback from users regarding what information was most helpful in diagnosing the error or failure. In this way, the smart assistant may learn how to better gather, record, and curate the more salient information.

E. Smart Assistant for Responding to a Computer Incident

Figure 9:
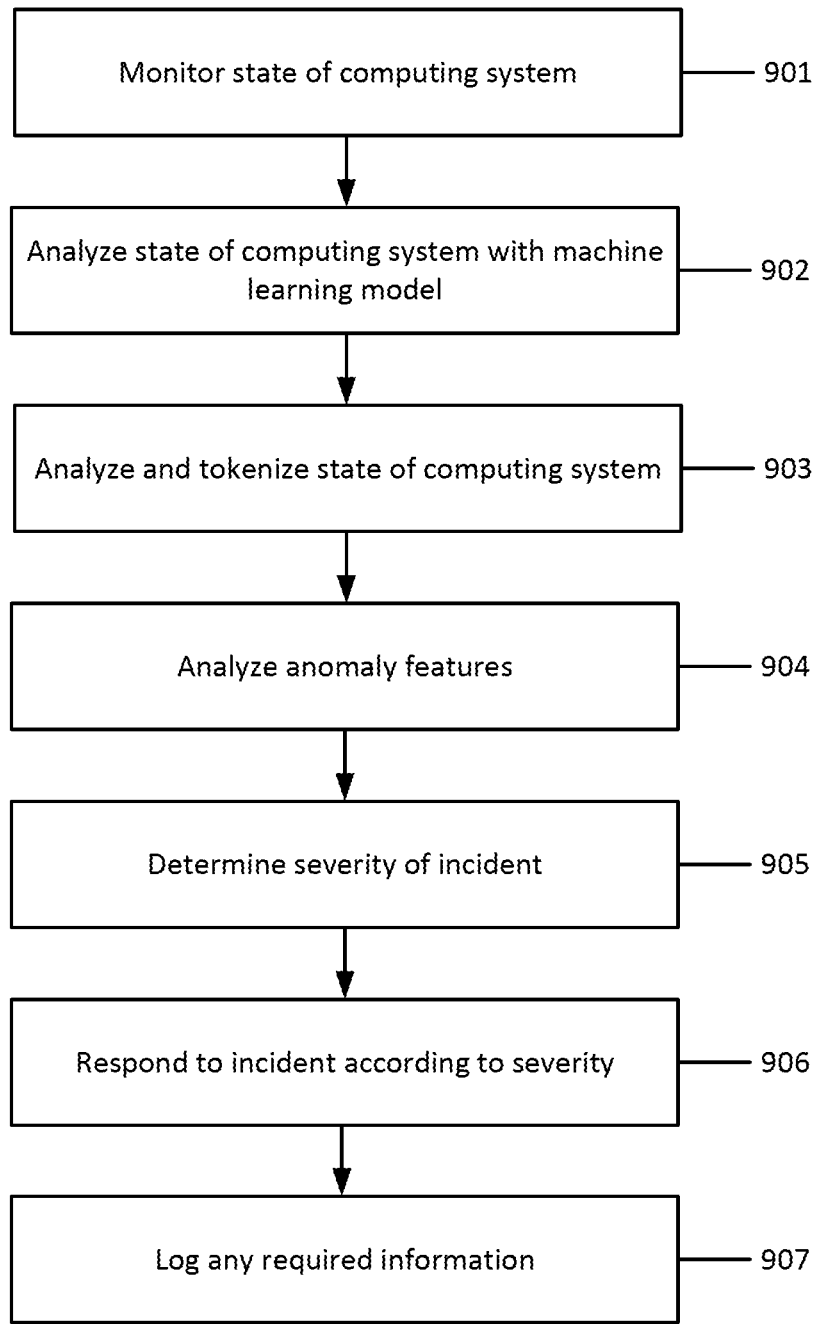
FIG. 9 illustrates a method of automatically responding to an incident according to a severity of the incident according to an embodiment.

In some embodiments, the smart assistant may make a decision in real-time as to how to respond to an incident such as an error condition, fault, or system outage. FIG. 9 illustrates a method of automatically responding to an incident according to a severity of the incident.

At step 901, a computer system monitors the state of one or more computing systems. In an embodiment, one or more log files of the one or more computing systems are monitored. In an embodiment, resource usage of the one or more computing systems are monitored. For example, CPU usage, network interface usage, memory consumption, or disk usage may be monitored. In an embodiment, the computer system may integrate directly with a runtime environment of a system to access a granular view of resource usage from the runtime's perspective. For example, in addition to knowing that memory usage is high, the smart assistant can monitor information about currently executing code such as the execution path of currently executing and combine that information with other state information such as memory usage or other resource usage. In this way, the smart assistant may gather additional information to aid in diagnosing issues.

At step 902, the state of the one or more computing systems are analyzed using a machine learning model. In an embodiment, an anomaly detection system monitors all monitored information, including server logs, resource usage, service availability (i.e., whether or not a service available to its intended audience), and other state information of the one or more computing systems. In an embodiment, the machine learning model is trained by a supervised learning method using historical server logs.

At step 903, the state of the one or more computing systems are tokenized into a set of anomaly features. For example, if the state of the one or more computing systems includes server logs, the server logs may be tokenized into a set of anomaly features. An anomaly feature may be, for example, the presence of an anomalous error code in a log file, or a ratio of erroneous indications in a log file. For example, a proportion of errors codes to success codes in a log file may be an anomaly feature. If resource usages of the computing systems are monitored, an anomaly feature may represent an unusual pattern of resource usage. In some embodiments, a combination of log files and resource usage may be combined in anomaly detection. For example, a spike in resource usage combined with an unusual log behavior may indicate an anomaly feature.

At step 904, a machine learning model analyzes the set of anomaly features. In an embodiment, the machine learning model is trained on examples of past incidents and corresponding anomaly features at the time of the past incidents. Patterns of anomaly features associated with system outage incidents are identified by the machine learning model, and a response taken.

At step 905, the machine learning model determines a severity of the incident based on the analysis of the set of anomaly features. A severity of the incident may be determined on a rating scale, for example. The machine learning model may be trained on past incidents and their severities.

At step 906, the smart assistant may respond to the incident according to its severity. The smart assistant may select from a range of options to respond to the incident. For example, an alert message may be transmitted to a designated user responsible for responding to incidents on the computing system. A designated user may be, for example, an engineer on call to respond to issues with the computing system. The smart assistant may include a severity indicator such as "urgent" or "important" in the message. In addition, the method of communication may be selected based on severity. For example, a message with a higher level of urgency may be transmitted via a more instantaneous communications method such as a pager, while a lower level of urgency may be transmitted via email or logged as a ticket in a work tracking system.

In some embodiments, the smart assistant may write a message to a log file. The smart assistant may assign an important or urgency indicator to the log file entry, such as "Debug," "Info," "Warning," or "Error."

In some embodiments, the smart assistant may take action on the code running on the computing system directly. In an example, the smart assistant may halt or interrupt code running on the computing system. The smart assistant may similarly interact with the code running on the computing system to intervene and shut down gracefully.

In some embodiments, the smart assistant may alter code running on the computing system. For example, if the smart assistant monitors a program crash that includes a stack trace, the smart assistant may analyze the stack trace to determine how to fix the code. Other runtime information may similarly be used to diagnose the incident, such as resource usage and information from the runtime about what code is being executed.

At step 907, the smart assistant may log any information required to document the incident. Logged information may be used, for example, to diagnose or analyze the incident at a later time.

F. Smart Assistant to Improve Code Performance at Runtime

Figure 10:
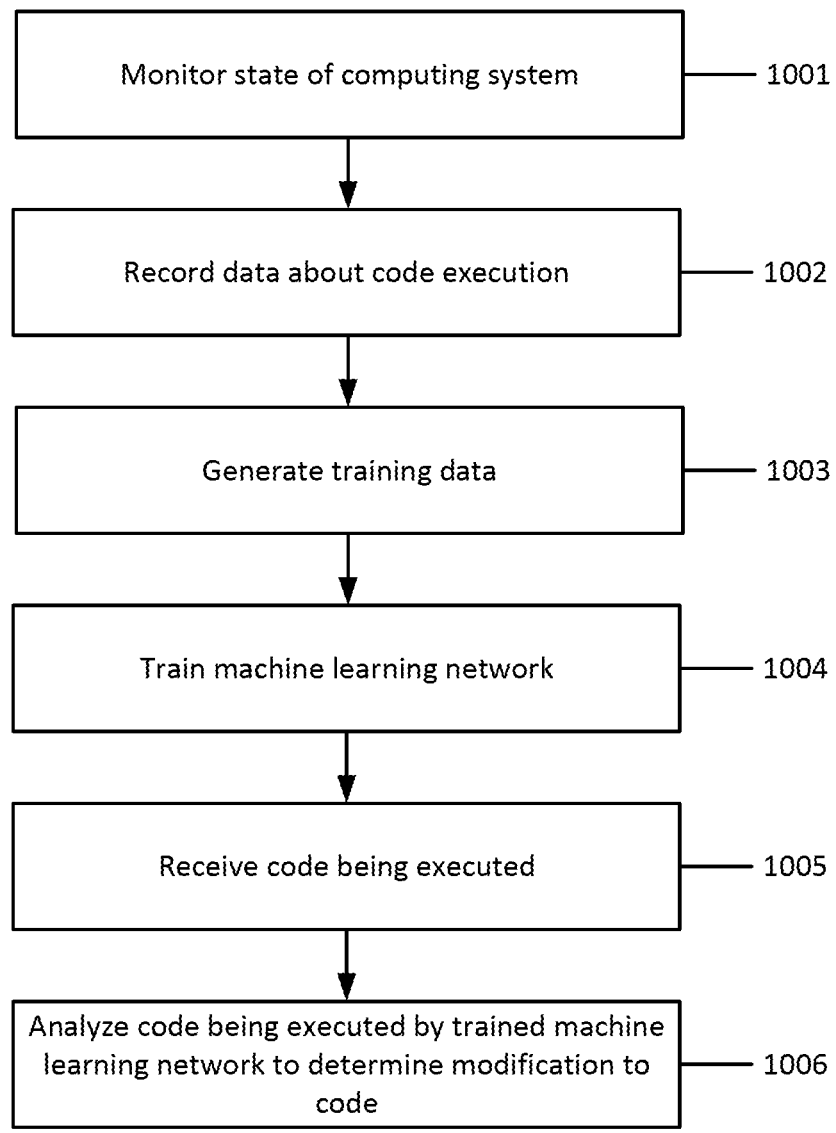
FIG. 10 illustrates a method of automatically improving code performance at runtime according to an embodiment.

In some embodiments, the smart assistant may interact with an intelligent runtime to automatically improve code execution performance at runtime. FIG. 10 illustrates a method of automatically improving code performance at runtime according to an embodiment.

At step 1001, a computer system monitors the state of one or more computing systems executing code. In an embodiment, one or more log files of the one or more computing systems are monitored. In an embodiment, resource usage of the one or more computing systems are monitored. For example, CPU usage, network interface usage, memory consumption, or disk usage may be monitored. The computer system may integrate directly with a runtime environment of a system to access a granular view of resource usage from the runtime's perspective. For example, in addition to knowing that memory usage is high, the smart assistant can monitor information about currently executing code such as the execution path of currently executing and combine that information with other state information such as memory usage or other resource usage. In this way, the smart assistant may gather additional information to aide in diagnosing issues.

At step 1002, data about the execution of code by the intelligent runtime is recorded. For example, performance metrics such as CPU usage, memory usage, latency, cache utilization, data transfer throughput, or other such performance metrics of code may be correlated with the code running in the runtime. In this way, the performance of code may be profiled as it is executed in the intelligent runtime.

At step 1003, additional training data is generated by introducing mutations into the code and observing effects on code execution performance. A functional code comparison may be used to ensure that mutated blocks of code have the same operation as original code. For example, a comparison of input and output data may be used to ensure equivalent operation of a block of mutated code compared to the original. In some embodiments, a formal verification of the mutated code may be performed to ensure that any mutations result in identical behavior between mutated code and original code.

A rules-based or heuristic model may be used to perform mutations on code. For example, optimization patterns such as function in-lining, loop unrolling, targeting specific hardware functions of a processor, or cache optimization strategies may be expressed in a library of hard-coded mutations to try on code.

At step 1004, training data including equivalent code portions and associated performance characteristics is aggregated and used to train a machine learning network to analyze code. A machine learning network may then be trained to identify patterns which produce more efficient code that is more efficient.

At step 1005, the smart assistant observes new code being executed by the intelligent runtime. At step 1006, the trained machine learning network is used to analyze segments of the new code and propose changes to the code to increase efficiency or performance. In some embodiments, the trained machine learning network may automatically patch code in the intelligent runtime to execute the more efficient variant.

In some embodiments, the trained machine learning network may make suggestions to programmers to increase the performance of the code.

G. Computing Environment

Figure 11:
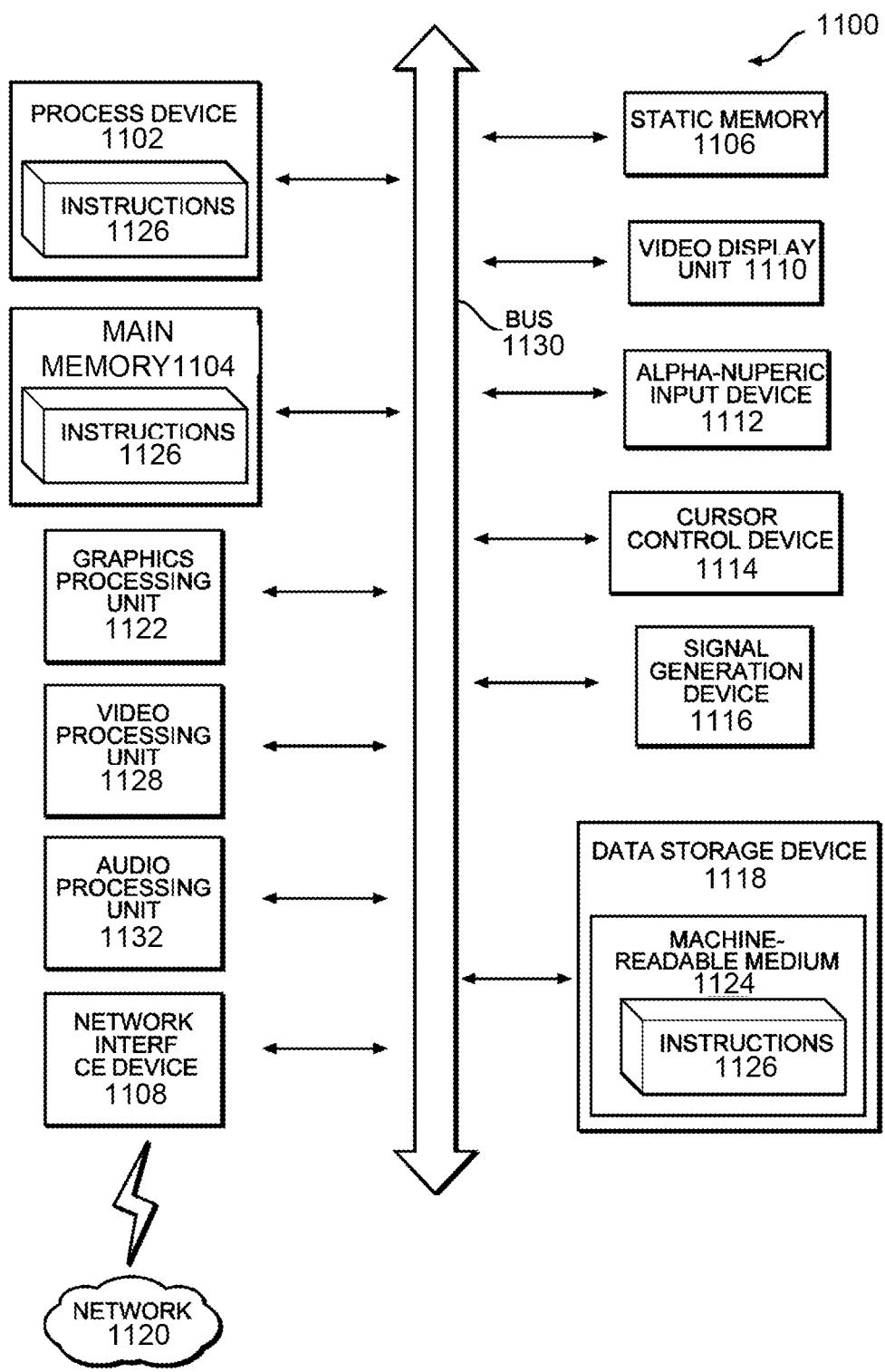
FIG. 11 illustrates an example machine of a computer system within which a set of instructions, for causing the machine to perform any one or more of the methodologies discussed herein, may be executed.

FIG. 11 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1115 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to the components of a device to perform the disclosure herein. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    receiving, by a computer system, a technical assistance request from a user, the technical assistance request being a request to detect system outages;
    analyzing, by a translator, the technical assistance request to determine an intent of the user, wherein the translator comprises a machine learning model;
    generating, by the translator, a sequence of instructions responsive to the intent of the user;
    performing, by a driver application, the sequence of instructions, wherein the driver application controls the execution of at least one computer applications, wherein the at least one computer applications are not the translator and not the driver application;
    analyzing, by an anomaly detection system, a server log to generate a set of anomaly features, the server log comprising textual events output by a server; and
    analyzing, by a machine learning model, the set of anomaly features to predict system outages, the machine learning model trained on examples of past system outages and corresponding server logs at the time of the past system outages.

2. The computer-implemented method of claim 1 further comprising:
    receiving the technical assistance request in the form of natural language text;
    parsing, by a parser, the technical assistance request into tokens; and
    determining the intent of the user from the parsed technical assistance request using a machine learning model.

3. The computer-implemented method of claim 2, wherein the machine learning model is a neural network.

4. The computer-implemented method of claim 1 further comprising: receiving the technical assistance request in the form of natural language text; parsing, by a parser, the technical assistance request into tokens;
    analyzing the parsed technical assistance request with a machine learning model and detecting a need for additional information;
    generating an information request;
    displaying the information request to the user;
    receiving additional information from the user;
    parsing, by the parser, the additional information into tokens;
    analyzing the parsed additional information with the machine learning model; and
    determining the intent of the user from the parsed technical assistance request and the parsed additional information using the machine learning model.

5. The computer-implemented method of claim 1, wherein the user interface element is a graphical user interface (GUI) request builder, wherein the GUI request builder includes a plurality of visible interface elements for building the technical assistance request.

6. The computer-implemented method of claim 1, wherein the driver application controls the execution of the at least one computer applications by using application programming interfaces (APIs) of the at least one computer applications.

7. The computer-implemented method of claim 1, wherein the driver application controls the execution of the at least one computer applications by using a machine learning-based driver, wherein the machine learning-based driver is a machine learning model trained on prior uses of the at least one computer applications.

8. The computer-implemented method of claim 7, wherein the prior uses include video frames of prior uses of the at least one computer applications.

9. The computer-implemented method of claim 8, wherein the driver application controls the execution of the at least one computer applications by mimicking human input.

10. The computer-implemented method of claim 1, wherein the technical assistance request is a request to configure a computer environment, and the driver application configures the computer environment according to the technical assistance request.

11. A computer-implemented method comprising:
    monitoring, by a computer system, user actions;
    analyzing the user actions using a machine learning model;
    determining, by the machine learning model based on the user actions, that the user is in need of technical assistance based on a technical assistance request that is a request to detect system outages;
    determining a type of technical assistance needed by the user;
    generating, by a translator, a sequence of instructions responsive to the type of technical assistance needed by the user;
    performing, by a driver application, the sequence of instructions, wherein the driver application controls the execution of at least one computer applications, wherein the at least one computer applications are not the translator and not the driver application
    analyzing, by an anomaly detection system, a server log to generate a set of anomaly features, the server log comprising textual events output by a server; and
    analyzing, by a machine learning model, the set of anomaly features to predict system outages, wherein the machine learning model is trained on examples of past system outages and corresponding server logs at the time of the past system outages.

12. The computer-implemented method of claim 11, further comprising:
displaying a message to the user to ask if technical assistance is needed, prior to performing the sequence of instructions.

13. The computer-implemented method of claim 12, further comprising: prompting the user for input about the type of technical assistance needed.

14. The computer-implemented method of claim 11, wherein the driver application controls the execution of the at least one computer applications by using application programming interfaces (APIs) of the at least one computer applications.

15. The computer-implemented method of claim 11, wherein the driver application controls the execution of the at least one computer applications by using a machine learning-based driver, wherein the machine learning-based driver is a machine learning model trained on prior uses of the at least one computer applications.

16. The computer-implemented method of claim 15, wherein the prior uses include video frames of prior uses of the at least one computer applications.

17. The computer-implemented method of claim 16, wherein the driver application controls the execution of the at least one computer applications by mimicking human input.

18. The computer-implemented method of claim 11, wherein the technical assistance request is a request to configure a computer environment, and the driver application configures the computer environment according to the technical assistance request.

* * * * *